US011899995B2

(12) United States Patent
Yamada

(10) Patent No.: US 11,899,995 B2
(45) Date of Patent: Feb. 13, 2024

(54) PROCESSING SYSTEM, SERVER SYSTEM, PRINTING DEVICE, AND NON-TRANSITORY COMPUTER-READABLE STORAGE MEDIUM STORING PROGRAM FOR DISPLAYING A SCREEN IN DISPLAY MODES ACCORDING TO A SITUATION OF PRINT JOB

(71) Applicant: SEIKO EPSON CORPORATION, Tokyo (JP)

(72) Inventor: Takeshi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/655,609

(22) Filed: Mar. 21, 2022

(65) Prior Publication Data
US 2022/0300226 A1 Sep. 22, 2022

(30) Foreign Application Priority Data

Mar. 22, 2021 (JP) ................................ 2021-046971

(51) Int. Cl.
*G06F 3/12* (2006.01)
*G06V 40/16* (2022.01)
*G06F 21/32* (2013.01)

(52) U.S. Cl.
CPC .......... *G06F 3/1238* (2013.01); *G06F 3/1222* (2013.01); *G06F 3/1253* (2013.01); *G06F 3/1288* (2013.01); *G06F 21/32* (2013.01); *G06V 40/172* (2022.01)

(58) Field of Classification Search
None
See application file for complete search history.

(56) References Cited

U.S. PATENT DOCUMENTS

2018/0075032 A1* 3/2018 Kimura ................. G06F 1/3287
2018/0275939 A1* 9/2018 Kanai ................... G06F 3/1222

FOREIGN PATENT DOCUMENTS

CN     102984421       3/2013
JP     2019-142126 A   8/2019

* cited by examiner

*Primary Examiner* — Andrew H Lam
(74) *Attorney, Agent, or Firm* — WORKMAN NYDEGGER

(57) ABSTRACT

A processing system includes an acquisition portion that acquires authentication result information for face authentication based on a captured image of a user, and a processor that performs a process for a print job. When it is determined that the user successfully logs in by the face authentication based on the authentication result information, the processor performs a process of displaying, on a display of a printing device, a screen having a different display mode according to a situation of the print job corresponding to the user.

9 Claims, 13 Drawing Sheets

PROCESSING SYSTEM, SERVER SYSTEM, PRINTING DEVICE, AND NON-TRANSITORY COMPUTER-READABLE STORAGE MEDIUM STORING PROGRAM FOR DISPLAYING A SCREEN IN DISPLAY MODES ACCORDING TO A SITUATION OF PRINT JOB

The present application is based on, and claims priority from JP Application Serial Number 2021-046971, filed Mar. 22, 2021, the disclosure of which is hereby incorporated by reference herein in its entirety.

BACKGROUND

1. Technical Field

The present disclosure relates to a processing system, a server system, a printing device, and a non-transitory computer-readable storage medium storing a program.

2. Related Art

In the related art, a processing system is known that permits a user to log in to an electronic device when the user is authenticated by face authentication. JP-A-2019-142126 discloses a method in which an image forming device executes a login process when a face authentication process of a person is successful, and executes a reserved print job.

The process for print job data accumulated in the printing device is not uniform. The process may contain print jobs or the like that are transmitted by mistake and that are wanted to delete by operating the printing device. In this case, it is not appropriate to execute printing on print jobs uniformly along with a login process. In the method described in JP-A-2019-142126, such a situation is not taken into consideration.

SUMMARY

According to a first aspect of the present disclosure, there is provided a processing system including an acquisition portion that acquires authentication result information for face authentication based on a captured image of a user, and a processing portion that performs a process for a print job, in which when it is determined that the user successfully logs in by the face authentication based on the authentication result information, the processing portion performs a process of displaying, on a display of a printing device, a screen having a different display mode according to a situation of the print job corresponding to the user.

According to a second aspect of the present disclosure, there is provided a server system including the processing system according to the first aspect, and a communicator that communicates with the printing device, in which the processing portion gives an instruction to display, on the display of the printing device, a screen having a different display mode according to a situation of the print job, via the communicator.

According to a third aspect of the present disclosure, there is provided a printing device including the processing system according to the first aspect and a printing portion.

According to a third aspect of the present disclosure, there is provided a non-transitory computer-readable storage medium storing a program, the program causing a computer to function as an acquisition portion that acquires authentication result information for face authentication based on a captured image of a user, and a processing portion that performs a process for a print job, in which when it is determined that the user successfully logs in by the face authentication based on the authentication result information, the processing portion performs a process of displaying, on a display of the printing device, a screen having a different display mode according to a situation of the print job corresponding to the user.

DESCRIPTION OF EXEMPLARY EMBODIMENTS

Hereinafter, the present embodiment will be described. It should be noted that the present embodiment described below does not unreasonably limit the content of the present disclosure described in the claims. Further, not all of the configurations described in the present embodiment are essential constituent requirements of the present disclosure.

Figure 1:
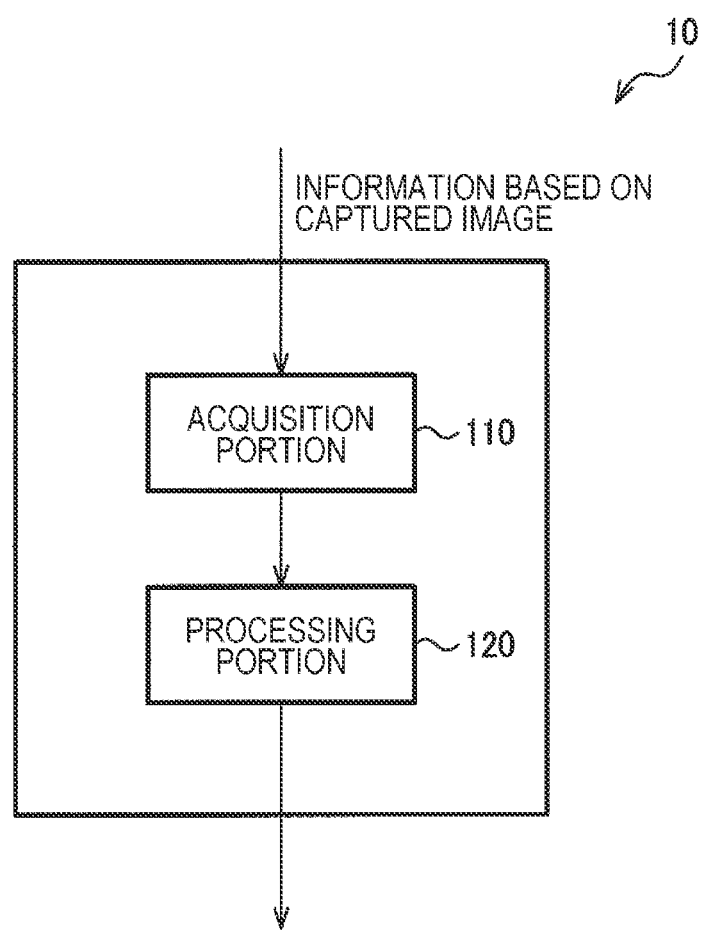
FIG. 1 is a block diagram showing a configuration example of a processing system.

FIG. 1 is a block diagram illustrating a processing system 10 of the present embodiment. The processing system 10 according to the present embodiment includes an acquisition portion 110 and a processing portion 120. The acquisition portion 110 is a communication interface for acquiring information based on a captured image of a user. Here, it does not matter whether the communication is wired communication or wireless communication. The information based on the captured image of the user includes, for example, authentication result information for face authentication based on the captured image of the user, but may be the captured image itself or other information. The authentication result information for the face authentication based on the captured image of the user is specifically information about the result of performing authentication on the captured face image of the user through a face authentication process. Further, although not shown, the processing system 10 may include a predetermined electronic device, and the predetermined electronic device may further include a display. The predetermined electronic device is, for example, a printing device, but may be another device.

The printing device here includes a multifunction device. The multifunction device refers to a printer including a function other than the printer function, and the function other than the printer function may be a copy function, a fax function, a scanner function, or the like, but other functions may be also possible.

The processing portion 120 controls each portion in the processing system 10, such as the acquisition portion 110, performs a login process and a logout process on the above-mentioned electronic device, and performs an execution of a job. Here, the job is, for example, in the case where the above-mentioned electronic device is the printing device, a print job transmitted to and accumulated in the printing device, but may be a command, an instruction, or the like given to another electronic device. In the following description, the job can be appropriately read as a print job. The processing portion 120 is specifically a processor or a controller. The processing portion 120 is, for example, a main central processing unit (CPU), but may include a plurality of CPUs such as sub CPUs. In this case, the main CPU controls each portion of the processing system 10 and controls the whole system. The sub CPU is, for example, a CPU that controls communication of a communicator 130 to be described later in FIG. 5. When the processing system 10 includes the above-mentioned printing device, the processing system 10 may further include a CPU that controls the printing device. Further, the processing portion 120 of the present embodiment can be constituted by the following hardware. The hardware can include at least one of a circuit that processes a digital signal and a circuit that processes an analog signal. The hardware can be constituted, for example, by one or more circuit devices or one or more circuit elements mounted on a circuit board. The circuit device is, for example, an integrated circuit device. Further, the circuit element is, for example, an active element such as a transistor or a passive element such as a resistor or a capacitor.

The face authentication process is a process of determining the validity of a person to be authenticated by comparing a feature quantity of the face image registered in advance with a feature quantity of the face image of the person to be authenticated at the time of authentication. Various processes can be mentioned in the face authentication process, and a process may be exemplified in which a facial part is detected for each of the captured face image of the user and the registered face image, facial feature points of each facial parts are detected based on the detected facial parts, and then the similarity of the facial parts are calculated based on the detected facial feature points. When the calculated similarity exceeds a predetermined threshold value, it is determined that the user of the captured face image and the person of the registered face image are the same person.

The detection of the facial part can be performed, for example, by using a method of discriminating between the face and non-face with a support vector machine for each of the captured face image of the user and the registered face image, but may also be performed by using a method of discriminating between the face and non-face using a deep neural network and a general learning vector quantization method.

The detection of facial feature points may be performed, for example, by a method of extracting feature points of eyes, a nose, a mouth, or the like, from the facial part, calculating a positional relationship of the feature points and predetermined characteristics in the vicinity of the feature points as feature quantities, and using the features as feature quantity vectors, but may be performed by other methods. The predetermined characteristics are, for example, shades and distribution of color.

The calculation of the similarity of the facial part is performed, for example, by a method of calculating the chi-square distance, the Euclidean distance, or the like, between the calculated feature quantity vectors for each of the captured face image of the user and the registered face image, but may be performed by other methods.

The face authentication process can be performed, for example, by predetermined hardware such as an image capturing device 20 described later in FIG. 5 and a first server 30, but the details thereof will be described later. In this case, the information based on the captured image acquired by the acquisition portion 110 is authentication result information for the face authentication based on the captured image of the user. Further, the processing portion 120 may be predetermined hardware that executes a program for the face authentication process. In this case, the information based on the captured image acquired by the acquisition portion 110 is data on the captured image itself transmitted from hardware having the image capturing function.

Next, processing procedure of the login process and the logout process of the processing system 10 of the present embodiment will be described. The processing system 10 performs a process of transmitting a login command to a predetermined electronic device in response to receiving a predetermined login request. An entity that transmits the predetermined login request may be the predetermined electronic device, but may be another device as long as it is a device associated with the predetermined electronic device. Similarly, the processing system 10 performs a process of transmitting a logout command to a predetermined electronic device in response to receiving a predetermined logout request. The predetermined login request and the predetermined logout request include authentication information input by a contact-type input means such as a button. Further, the processing system 10 can accept information based on the captured image as the login request and transmit the login command to the predetermined electronic device, and can perform a process such as the login process (step S10) based on face authentication to be described later in FIG. 3. Similarly, the processing system 10 can accept information based on the captured image as the logout request and transmit the logout command to the predetermined electronic device, and can perform a process such as the logout process (step S30) to be described later in FIG. 4.

Further, the logout process (step S30) described later in FIG. 4 can be combined with at least one of the predetermined login request described above or the login process (step S10). That is, the processing system 10 performs the logout process (step S30) after transmitting the login command to the predetermined electronic device by the predetermined login request through a contact method, and thus the processing procedure as shown in FIG. 2 can be obtained.

Figure 2:
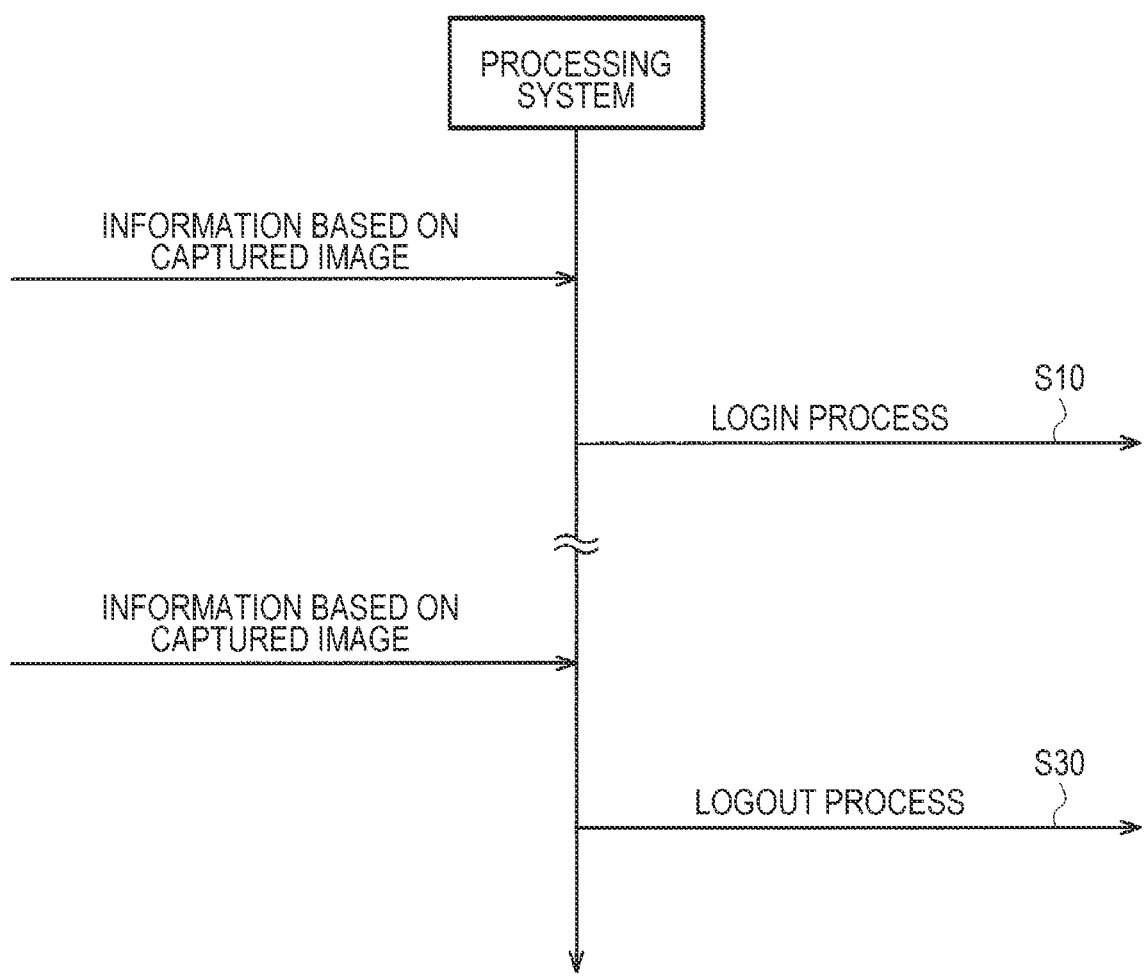
FIG. 2 is a diagram illustrating a processing procedure of the processing system.

FIG. 2 is a diagram illustrating a processing procedure when the above-mentioned login process (step S10) and logout process (step S30) are combined. In FIG. 2, the downward direction indicates a time-flowing direction, but does not indicate the specific length of time. The acquisition portion 110 receives the information based on the captured image corresponding to the login process (step S10) at a predetermined timing. Then, the processing portion 120 performs the login process (step S10). Then, the acquisition portion 110 receives the information based on the captured image corresponding to the logout process (step S30) at a timing after the predetermined timing. Then, the processing portion 120 performs the logout process (step S30).

Figure 3:
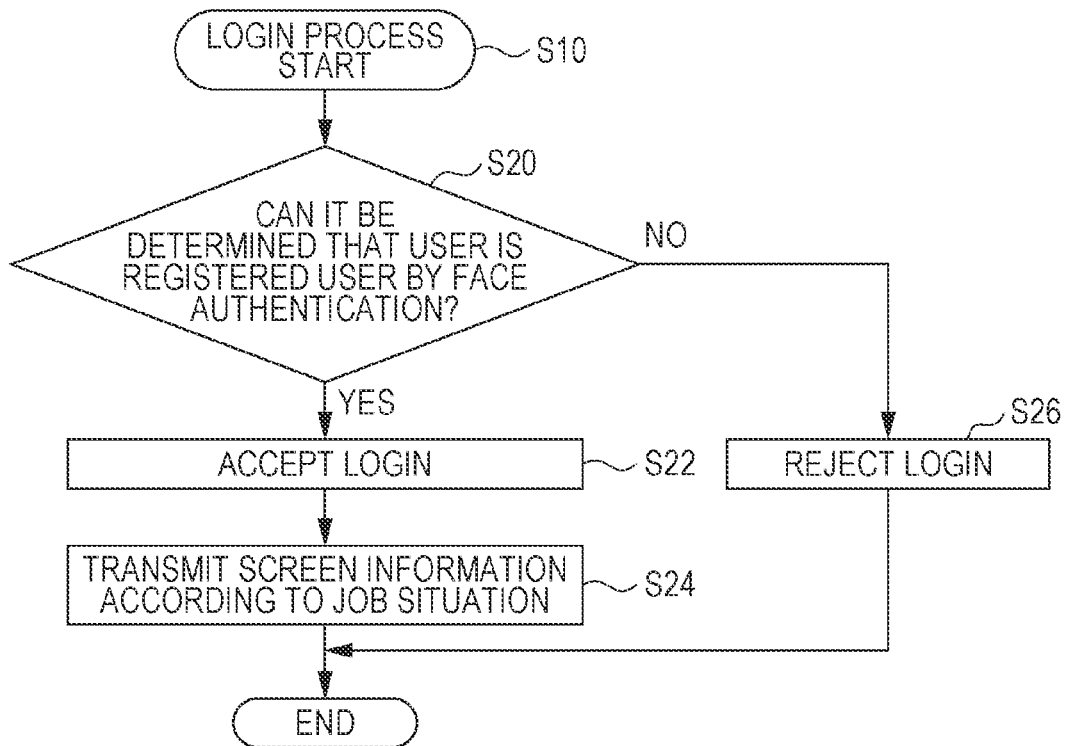
FIG. 3 is a flowchart illustrating a login process.

The details of the process of FIG. 2 will be described with reference to FIGS. 3 and 4. FIG. 3 is a flowchart illustrating a processing example of the login process (step S10). The processing portion 120 performs a process of determining whether or not the user is a registered user by face authentication, and when it can be determined that the user is a registered user (YES in step S20), a process of accepting login (step S22) is performed. For example, the first server 30 to be described later in FIG. 5 performs a face authentication process, the acquisition portion 110 acquires information indicating the determination that the captured person is the same person as the registered user, and the processing portion 120 performs a process of transmitting a command to log in to the above-mentioned printing device or the like based on the information. Further, for example, the processing portion 120 may perform the face authentication process, determine that the captured person is the same person as the registered user, and perform a process of transmitting the command to log in to a printing device or the like.

Then, the processing portion 120 performs a process (step S24) of transmitting screen information according to a job situation, and ends the procedure. The job situation is, for example, the number of jobs, but is not limited thereto, and may be a job status or the like. For example, when the job situation is the number of jobs, the user may appropriately decide whether or not to include the jobs with errors during transmission in the number of jobs. Further, a predetermined printing situation may be taken into consideration in the job situation. The predetermined printing situation is, for example, a situation such as the remaining amount of ink contained in the printing device. For example, as will be described later in FIG. 13 and the like, the processing portion 120 performs a process of transmitting, to the printing device, a command to display different types of screen information according to the number of print jobs related to the user based on the face authentication.

On the other hand, when it cannot be determined that the user is a registered user (NO in step S20), the processing portion 120 performs a process of rejecting the login (step S26) and ends the procedure. The process of rejecting the login (step S26) is, for example, a process of discarding data on the captured image, but the process is not limited thereto, and a process of reporting an error may be added.

As described above, the processing system 10 of the present embodiment includes the acquisition portion 110 that acquires authentication result information for face authentication based on the captured image of the user, and the processing portion 120 that performs a process for a print job. When it is determined that the user successfully logs in by the face authentication based on the authentication result information (YES in step S20), the processing portion 120 performs a process of displaying, on a display of the printing device, a screen having a different display mode according to a situation of the print job corresponding to the user (step S24).

As described above, since the processing system 10 of the present embodiment includes the acquisition portion 110 and the processing portion 120, it is possible to process the authentication result of face authentication based on the captured image. Further, the processing portion 120 can display appropriate screen information on the display of the printing device according to the job situation. This makes it possible to improve the convenience of the printing device. For example, it is clear that, when the user logs in to the printing device with only one print job accumulated, the one accumulated print job will be printed, and thus it is convenient for the user to execute printing of the print job when the login is accepted. On the other hand, when the user logs in to the printing device with a plurality of print jobs accumulated, in some cases, the user may not intend to print all the accumulated print jobs. Alternatively, there is a possibility that the user intends to delete the print job transmitted by mistake by the operation of the printing device. In this case, it is not appropriate to print all print jobs uniformly at the same time as accepting login. Further, even if the printing device accumulates one print job, it is not appropriate to execute printing in a situation where the ink remaining amount of the printing device is not sufficient. In that respect, by applying the method of the present embodiment, it is possible to display appropriate screen information according to the job situation.

Moreover, the method of the present embodiment may be implemented by a program. That is, the program of the present embodiment causes a computer to function as the acquisition portion 110 that acquires authentication result information for face authentication based on the captured image of the user, and the processing portion 120 that performs a process for a print job. Further, when it is determined that the user successfully logs in by the face authentication based on the authentication result information, the processing portion 120 performs a process of displaying a screen having a different display mode on a display of the printing device according to the situation of the print job corresponding to the user. In this way, the same effect as described above can be obtained.

Figure 4:
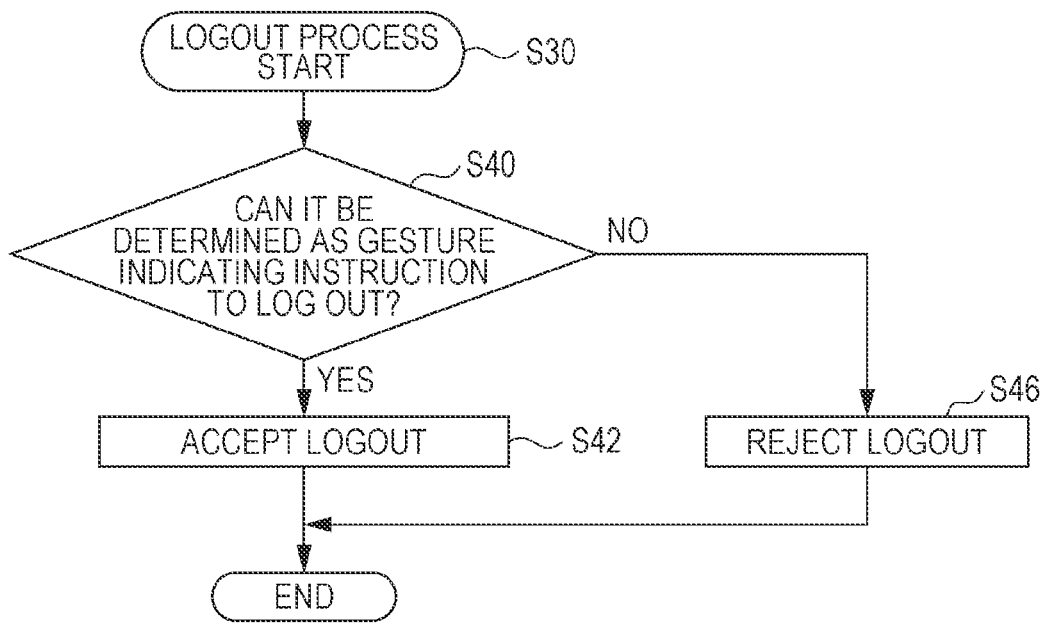
FIG. 4 is a flowchart illustrating a logout process.

FIG. 4 is a flowchart illustrating a processing example of the logout process (step S30). The processing portion 120 performs a process (step S40) of determining whether or not information based on the captured image is a gesture indicating a logout instruction. Specifically, the processing system 10 stores, for example, information about a gesture indicating the logout instruction in a memory (not shown) in advance. Then, the user makes a predetermined gesture by using the hardware used for face authentication. Then, the processing portion 120 determines whether or not a similarity between the captured image based on the gesture of the user and the information about the stored gesture exceeds a predetermined threshold value, by the above-mentioned process. When it can be determined that the gesture indicates the logout instruction (YES in step S40), the processing portion 120 performs a process of accepting logout (step S42) and ends the procedure. Specifically, when the above-mentioned similarity exceeds the predetermined threshold value, the processing portion 120 performs a process of transmitting a command to log out to the above-mentioned printing device. On the other hand, when it cannot be determined that the information based on the captured image is the gesture indicating the logout instruction (NO in step S40), the processing portion 120 performs a process of rejecting the logout (step S46) and ends the procedure. The process of rejecting the logout (step S46) is, for example, a process of discarding the data on the captured image data about the gesture, but a process of reporting an error may be added.

Here, the gesture is, for example, an action of shaking the hand from side to side and front and rear, or bending and stretching a finger; however, the gesture is not limited thereto, and may be a predetermined facial expression, a movement of the neck or shoulder, or a predetermined pose. The predetermined facial expression is, for example, making a surprised expression by opening the eyes or mouth, closing one eye, or blinking a predetermined number of times. The predetermined pose is, for example, making the same shape as a character such as an alphabet with a finger for a certain period of time.

As described above, the processing system 10 of the present embodiment includes the acquisition portion 110 that acquires information based on the captured image of the user, and the processing portion 120 that performs the login process and the logout process (step S30) for the electronic device. When it is determined that a gesture of a user for instructing to log out from the electronic device is performed based on the captured image of the user, the processing portion 120 performs the logout process. As described above, since the processing system 10 of the present embodiment includes the acquisition portion 110 and the processing portion 120, the processing system 10 may perform the process of transmitting the login or logout instruction to a predetermined electronic device based on information based on the captured image. Further, since the processing portion 120 performs the logout process when it is determined that the gesture is performed, the user can execute logout based on his/her own intention without contacting the electronic device at the timing when he/she wants to end the use of the electronic device. In the related art, since the electronic device logs out after a certain period of time has elapsed since the user went out of an image-capturing range, when the user goes out of the image-capturing range while using the predetermined electronic device, unintended logout may occur, which may result in a problem with convenience. In that respect, by applying the method of the present embodiment, the user can intentionally log out at the timing when he/she wants to end the use of the predetermined electronic device. There has never been such a processing system.

Moreover, the method of the present embodiment may be implemented by a program. That is, the program of the present embodiment causes a computer to function as the acquisition portion 110 that acquires information based on the captured image of the user, and the processing portion 120 that performs the login process and the logout process on the electronic device. Further, when it is determined that the gesture of the user for instructing to log out from the electronic device is performed based on the information based on the captured image of the user, the processing portion 120 performs the logout process. In this way, the same effect as described above can be obtained.

Moreover, the method of the present embodiment may be implemented by a processing method. That is, the processing method of the present embodiment includes performing a login process on an electronic device, and performing a logout process on the electronic device when information based on a captured image of a user is acquired and it is determined that a gesture of the user for instructing to log out from the electronic device is performed by information based on the captured image of the user. In this way, the same effect as described above can be obtained.

Further, as shown in FIG. 2, the processing portion 120 may perform the login process (step S10) by information based on the captured image corresponding to the login process (step S10), and then performs the logout process (step S30) by information based on the captured image corresponding to the logout process (step S30). That is, when it is determined that the gesture for instructing logout is performed after the login of the user is performed by the face authentication process based on the captured image, the processing portion 120 performs the logout process. By doing so, the user who logs in based on the non-contact face authentication can log in to and out from the predetermined electronic device without contact by logging out based on the non-contact gesture. In particular, in a situation where there are a plurality of types of authentication means, a user logged in by face authentication may have an intention to log in without contact. In this respect, by applying the method of the present embodiment, it is possible to log out without contact, which improves convenience.

The processing system 10 of the present embodiment is not limited to the above-described configuration, and various modifications such as adding other components can be performed. FIG. 5 is a block diagram illustrating a more detailed configuration example of the processing system 10 of the present embodiment. The processing system 10 of FIG. 5 includes an image capturing device 20, a first server 30, a second server 100, an electronic device 200, and a terminal device 300. The second server 100 includes the acquisition portion 110 and the processing portion 120 described above, and further includes a communicator 130. The electronic device 200 includes a display 240. The communicator 130 is an interface for communication connection with the electronic device 200 and the terminal device 300, but may be the same interface as the acquisition portion 110 described above. The electronic device 200 is, for example, a printing device, but may be another device. When the electronic device 200 is a printing device, it further includes a printing portion (not shown).

Figure 5:
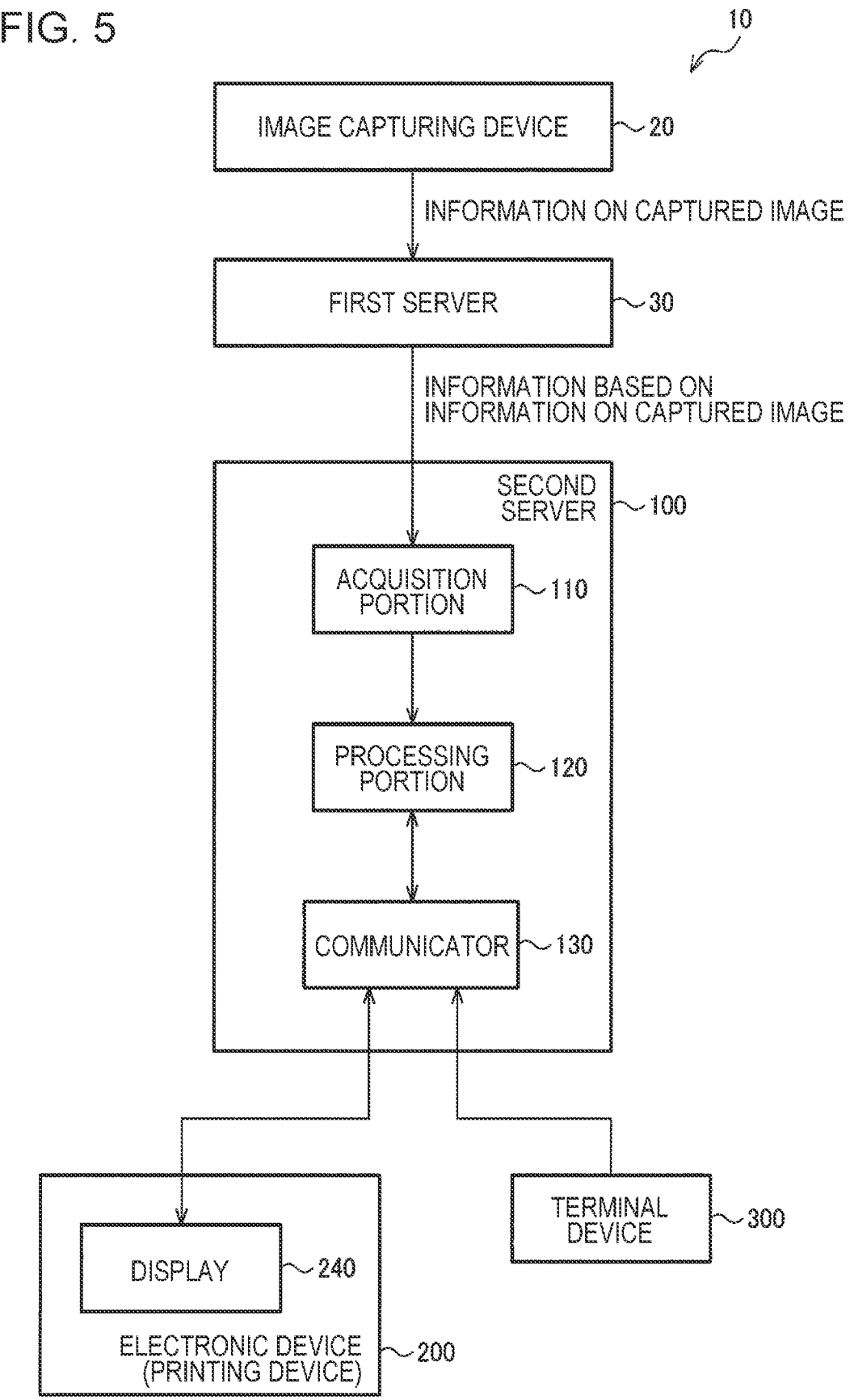
FIG. 5 is a block diagram showing a more detailed configuration example of the processing system.

The functions of the acquisition portion 110 and the processing portion 120 in FIG. 5 correspond to some of the functions of the acquisition portion 110 and the processing portion 120 of FIG. 1, respectively. Therefore, the second server 100 can be considered as a server system in which the processing system 10 of FIG. 1 is further provided with the communicator 130. That is, the server system of the present embodiment includes the above-mentioned processing system 10 and the communicator 130 that communicates with the electronic device 200. By doing so, it is possible to construct a server system that acquires information based on the captured image and performs the login process and the logout process on the electronic device 200.

The image capturing device 20 is located at a predetermined location near the electronic device 200, for example, captures an image of a user who wants to operate the electronic device 200, and transmits information on a captured image to the first server 30 to be described later. The image capturing device 20 and the electronic device 200 do not need to be directly connected to each other by communication. This is because, since the information on the captured image includes the identification information for the image capturing device 20 itself, the user can determine which the image capturing device 20 corresponds to which electronic device 200 by associating the identification information for the image capturing device 20 with the identification information for the electronic device 200. The image capturing device 20 can be built by, for example, a near-infrared camera, but may be another camera. Further, the image capturing device 20 may be formed of a plurality of cameras.

In the case of FIG. 5, the first server 30 performs face authentication based on the above-mentioned information on the captured image, and transmits the information based on the captured image to the second server 100. The information based on the captured image is authentication result information for the face authentication. The first server 30 includes a memory (not shown). For example, the memory stores image information about the face of a registered user used for a face authentication program or face authentication, but may also store image information about the above-mentioned gesture. The first server 30 can perform the face authentication process by including hardware such as a processor or a controller in addition to the above-mentioned memory.

The second server 100 receives information based on the captured image from the first server 30, and determines whether to accept login or logout for the electronic device 200 corresponding to the image capturing device 20. Further, the second server 100 receives predetermined job data from the terminal device 300 and stores it in a memory (not shown). The predetermined job data is, for example, print job data when the electronic device 200 is a printing device. The predetermined job data transmitted by the terminal device 300 includes user identification information. Therefore, when the user logs in to the electronic device 200, the job information about the logged-in user is displayed on the display 240.

The display 240 can be built by, for example, a liquid crystal display, but may be built by an organic electroluminescent (EL) display, a dot matrix light-emitting diode (LED), or the like. Further, the display 240 may be integrated hardware with an operation portion (not shown) and a touch panel, or may give the user a report on the electronic device 200 together with a report portion (not shown). In the present embodiment, the display 240 is a touch panel.

Figure 6:
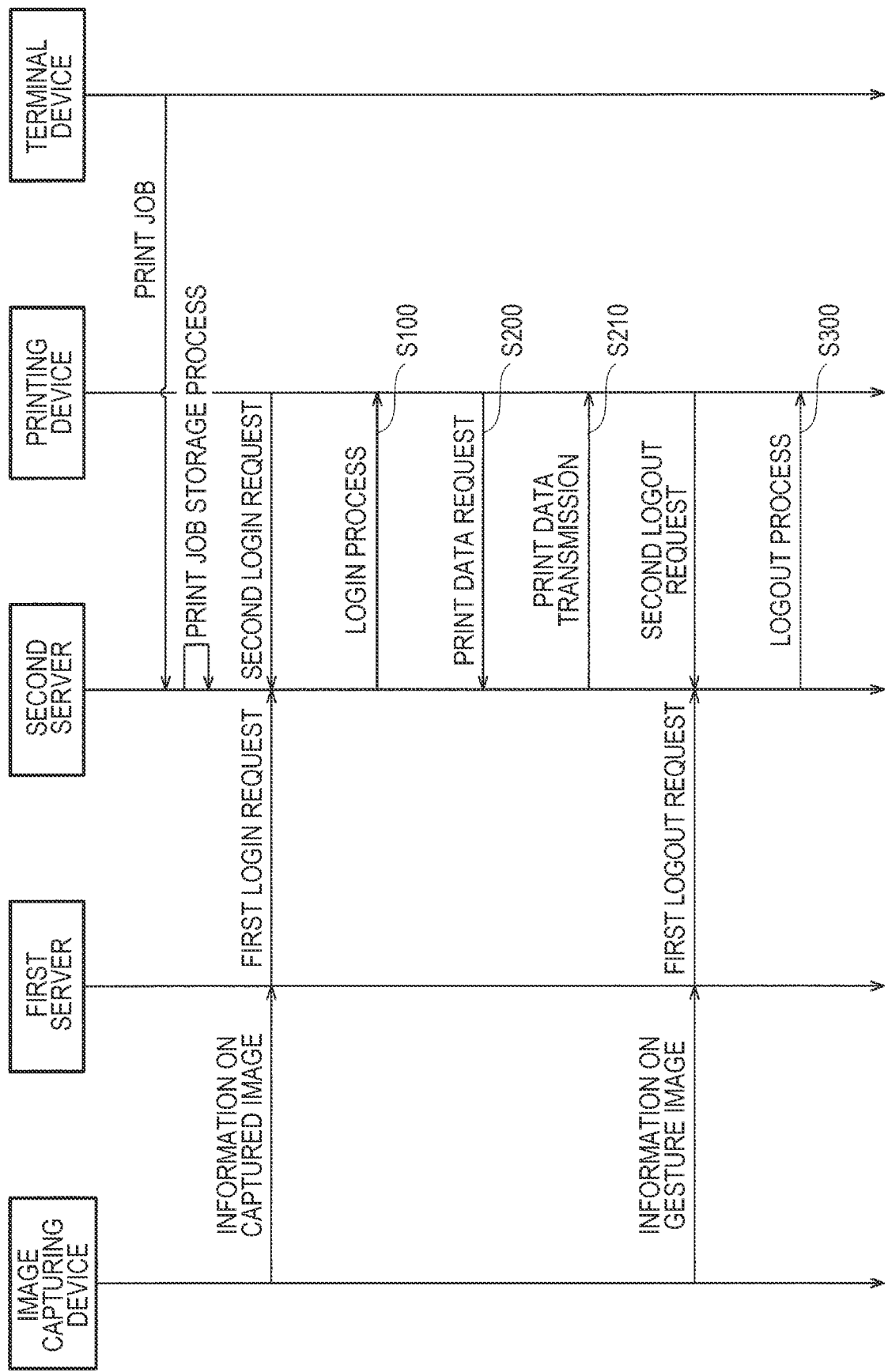
FIG. 6 is a diagram illustrating a processing procedure of the processing system in more detail.

FIG. 6 is a diagram illustrating a processing procedure of the entire processing system 10 in FIG. 5. Here, it is assumed that the electronic device 200 is a printing device. The terminal device 300 transmits a print job to the second server 100, and the second server 100 performs a print job storage process. Then, the second server 100 receives either a first login request or a second login request. The first login request is authentication information transmitted from the first server 30 based on information on the captured image transmitted from the image capturing device 20. The second login request is authentication information that is not based on the information on the captured image, for example, authentication information transmitted by the user inputting and operating a predetermined operation portion, or authentication information by using a predetermined electronic medium. The predetermined operation portion is, for example, a button (not shown), but may be a touch panel of the display 240.

After receiving the first login request or the second login request, the processing portion 120 performs a login process (step S100) on the printing device. Although both the first login request and the second login request are shown in FIG. 6, one of them is actually transmitted to the second server 100. The same is applied to a first logout request and a second logout request to be described later. Then, when a print data request (step S200) based on job information about the user displayed on the display 240 is received from the printing device, the processing portion 120 transmits print data (step S210). In this way, the printing device executes printing based on the received print data, and the user can obtain a desired printed matter. Depending on the job situation, the print data may be transmitted to the printing device even if there is no print data request (step S200), and the details will be described later with reference to FIG. 8.

Then, the second server 100 receives either the first logout request or the second logout request. The first logout request is authentication information transmitted from the first server 30 based on information on a gesture image transmitted from the image capturing device 20. The second logout request is authentication information that is not based on the information on the captured image, like the second login request. After receiving the first logout request or the second logout request, the processing portion 120 performs a logout process (step S300) on the printing device.

Next, the specific content of each process of FIG. 6 will be described with reference to FIGS. 7, 8, 9, 10, 10, 11, and 12. Here, a description will be given including a processing example in which a screen display after login by face authentication is different depending on the number of print jobs, which is an example of a print job status. That is, the processing portion 120 performs a process of displaying the screens having different display modes depending on the number of print jobs on the display 240. By doing so, the electronic device 200 can display appropriate screen information on the display 240 depending on the number of print jobs.

Figure 7:
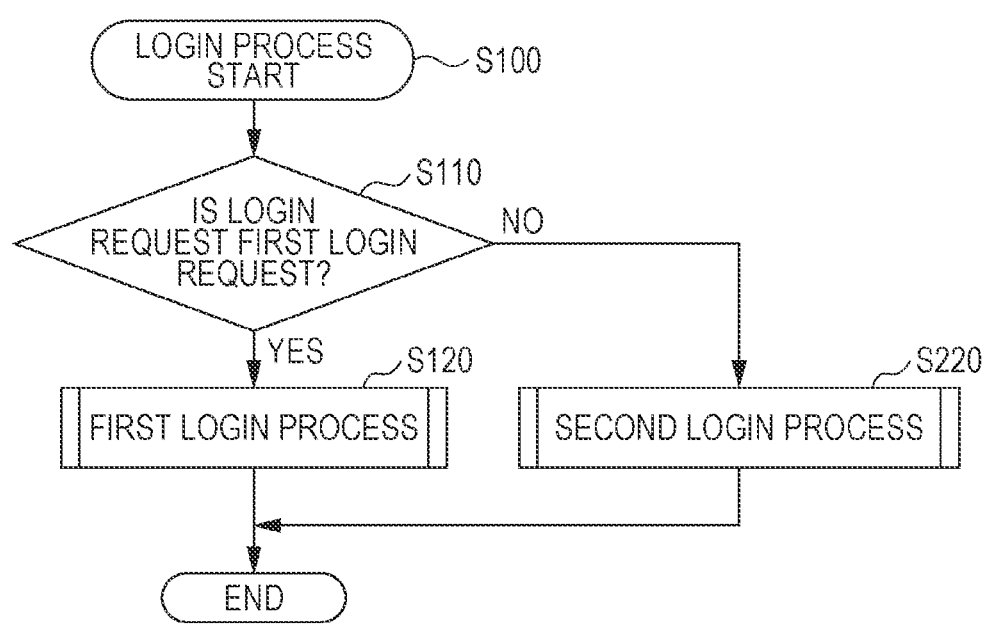
FIG. 7 is a flowchart illustrating a login process according to another example.

FIG. 7 is a flowchart illustrating the login process (step S100). The processing portion 120 performs a process of determining whether the login request is the first login request or the second login request, and when the login request is the first login request (YES in step S110), performs the first login process (step S120) and ends the procedure. On the other hand, when the login request is the second login request (NO in step S110), the processing portion 120 performs the second login process (step S220) and ends the procedure.

Figure 8:
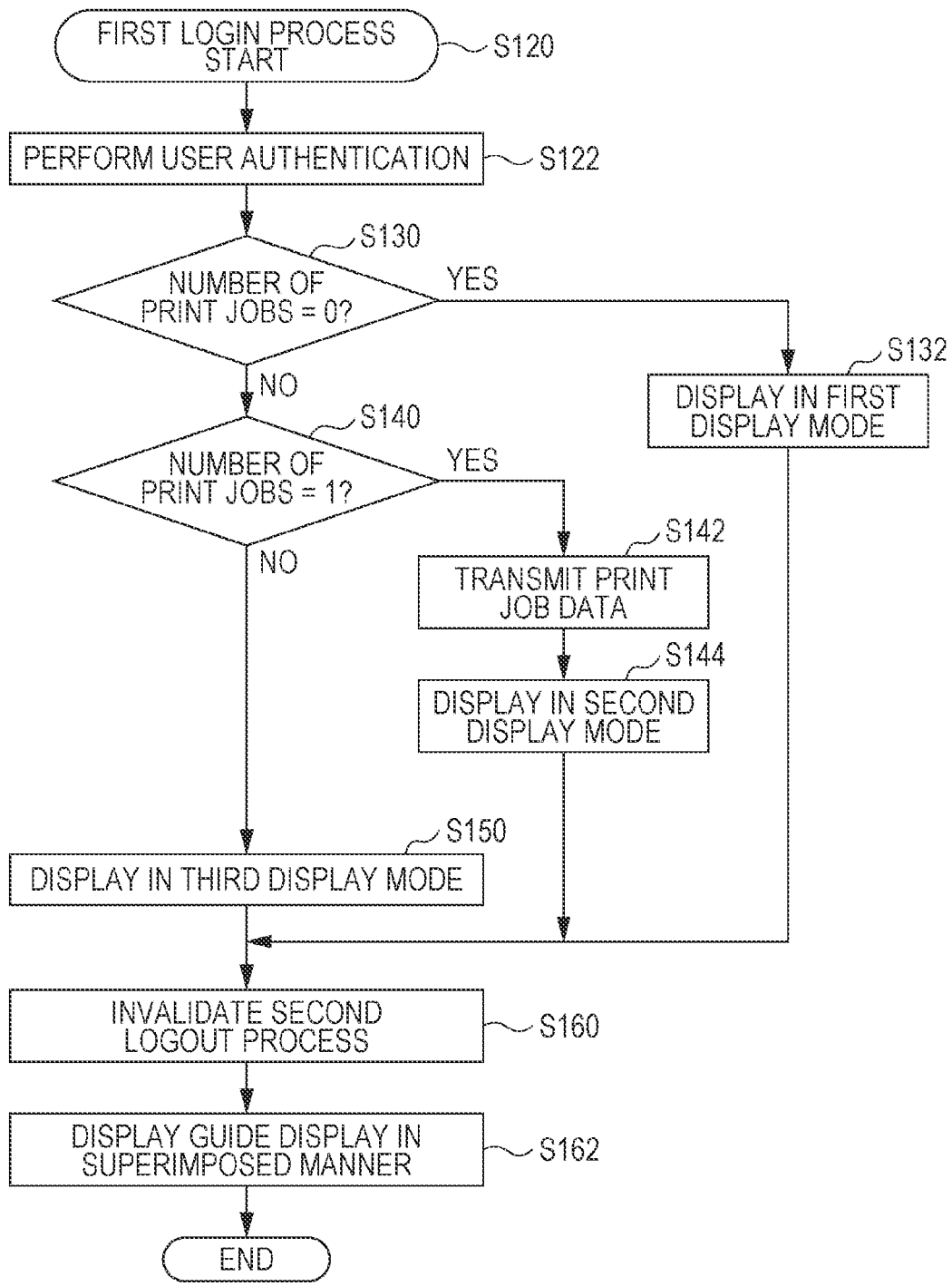
FIG. 8 is a flowchart illustrating a first login process.

FIG. 8 is a flowchart illustrating the first login process (step S120). The processing portion 120 performs user authentication (step S122). When there is a problem with user authentication, the process will not proceed to a subsequent process, but here it is assumed that there is no problem with user authentication and the process will proceed. The same is applied to the description of FIGS. 9, 13, and 14 to be described later. Then, the processing portion 120 performs a process of determining whether or not the number of print jobs of the user accumulated in the printing device is zero, performs a process (step S132) of transmitting, to the printing device, an instruction to cause the display 240 to display in a first display mode when the number of print jobs is zero (YES in step S130), and then performs processes of step S160 and subsequent steps. On the other hand, when the number of print jobs is not zero (NO in step S130), the processing portion 120 performs a process of determining whether or not the number of print jobs is one, performs a process (step S144) of transmitting, to the printing device, an instruction to cause the display 240 to display in the second display mode when the number of print jobs is one (YES in step S140), performs a process (step S142) of transmitting print job data to the printing device, and then performs processes of step S160 and subsequent steps. Step S142 is a process corresponding to step S210 described above in FIG. 6, and the printing device that receives the print job data transmitted in step S142 executes printing based on the print job data. As described above, the print job data may be transmitted to the printing device even if the above-mentioned step S200 is not performed in FIG. 6. Further, when the number of print jobs is two or more (NO in step S140), the processing portion 120 performs a process (step S150) of transmitting, to the printing device, an instruction to cause the display 240 to display in a third display mode, and then performs processes of step S160 and subsequent steps.

As described above, in the first login process (step S120), the processing portion 120 of the present embodiment performs processes of dividing the number of jobs into three patterns and displaying, on the display 240, screens having different display modes for each pattern. That is, when the number of print jobs for the user when the login is successful is zero, the processing portion 120 displays a screen of the first display mode. Moreover, when the number of print jobs for the user when the login is successful is one, the processing portion 120 displays a screen of the second display mode. Moreover, when the number of print jobs for the user when the login is successful is two or more, the processing portion 120 displays a screen of the third display mode. By doing so, it is possible to perform an appropriate guide display according to the number of print jobs.

Specifically, the processing portion 120 of the second server 100 as a server system generates display screen data depending on the first display mode to the third display mode. Then, the processing portion 120 performs a process of transmitting the display screen data to the electronic device 200 as a printing device via the communicator 130 at a predetermined timing. The same is applied to step S232 and step S250 in FIG. 9. That is, the server system of the present embodiment includes the above-mentioned processing system 10 and the communicator 130 that communicates with the electronic device 200 that is a printing device, and the processing portion 120 gives an instruction to display a screen having a different display mode on the display 240 of the electronic device 200, which is the printing device, according to the situation of the print job, via the communicator 130. By doing so, it is possible to construct a server system that generates an appropriate guide display and displays the screen of the guide display on the printing device. A specific screen example of the first display mode to the third display mode will be described later with reference to FIG. 13.

Then, the processing portion 120 performs a process (step S160) of invalidating the second logout process (step S330) to be described later in FIG. 12. That is, when the first login process (step S120) based on the captured image is performed as the login process, the processing portion 120 invalidates the second logout process (step S330). By doing so, the user who selects to use the electronic device 200 based on the non-contact-type login can be prevented from logging out by the contact method.

Specifically, a process of generating image data that does not reflect a logout button icon 540 to be described later in FIG. 13 or the like in the above-mentioned first display mode to the third display mode is performed. That is, the processing portion 120 performs the first login process (step S120) based on the captured image and the second login process (step S220) based on information other than the captured image, as the login process. Then, when the first login process (step S120) is performed, the processing portion 120 invalidates display of an instruction of the second logout process (step S330) corresponding to the second login process (step S220) on the display 240 of the electronic device 200. By doing so, the user can confirm that he/she logs in in a non-contact manner.

Then, the processing portion 120 performs a process (step S162) of displaying the guide display in a superimposed manner. Specifically, as will be described later in FIG. 13, the processing portion 120 performs a process of generating image data in which a logout method guide icon 530 is reflected in the above-mentioned first display mode to the third display mode. Since step S162 is a process performed when login is performed by face authentication, displaying the logout method guide icon 530 described later in FIG. 13 means that face authentication is successful. That is, when the face authentication is successful, the processing portion 120 of the present embodiment performs a display process of notifying that the face authentication is successful, on the display 240 of the printing device. By doing so, the user can confirm that he/she logs in by face authentication.

Figure 9:
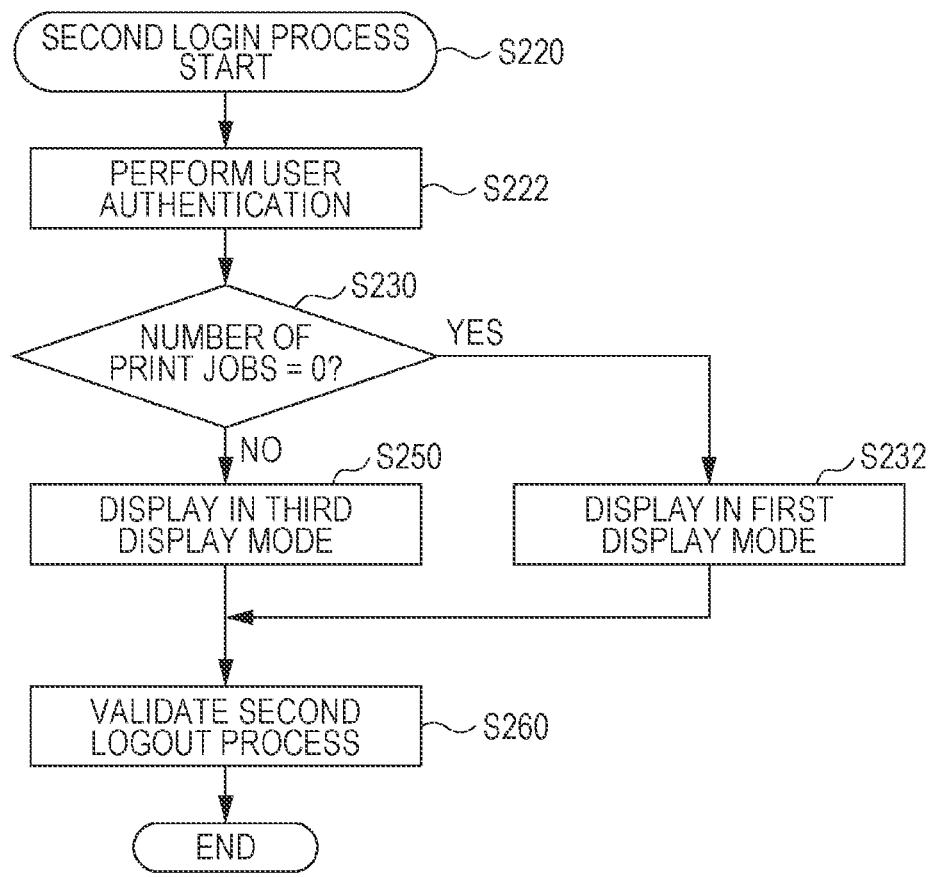
FIG. 9 is a flowchart illustrating a second login process.

FIG. 9 is a flowchart illustrating the second login process (step S220). The processing portion 120 performs user authentication (step S222) in the same manner as in step S122 described above. Then, the processing portion 120 performs a process of determining whether or not the number of print jobs of the user accumulated in the printing device is zero, performs a process (step S232) of displaying in a first display mode when the number of print jobs is zero (YES in step S230), and then performs a process of step S260. On the other hand, when the number of print jobs is not zero (NO in step S230), the processing portion 120 performs a process (step S250) of transmitting, to the printing device, an instruction to cause the display 240 to display in a third display mode, and then performs a process of step S260.

Then, the processing portion 120 performs a process (step S260) of validating the second logout process (step S330) to be described later in FIG. 12. Specifically, as will be described later with reference to FIG. 14, a process of transmitting, to the printing device, an instruction to display the logout button icon 540 on the display 240 is performed.

From FIGS. 8 and 9, when the first login process (step S120) is executed, the user can only log out by the first logout process (step S320). Further, since the second login process (step S220) does not have the process corresponding to step S162 in FIG. 8, the logout method guide icon 530 to be described later in FIG. 13 is not displayed. Therefore, the user cannot recognize the logout method by the gesture, and naturally prompts the logout by the second logout process (step S330). As described above, when the first login process (step S120) based on the captured image is performed as the login process, the processing portion 120 of the present embodiment performs the first logout process (step S320) based on the captured image about the gesture as the logout process. Further, when the second login process (step S220) based on the information other than the captured image is performed, the processing portion 120 performs the second logout process (step S330) based on the information other than the captured image as the logout process. By doing so, the method of logging in to and out from the electronic device 200 can be matched to either the non-contact method or the contact method.

Figure 10:
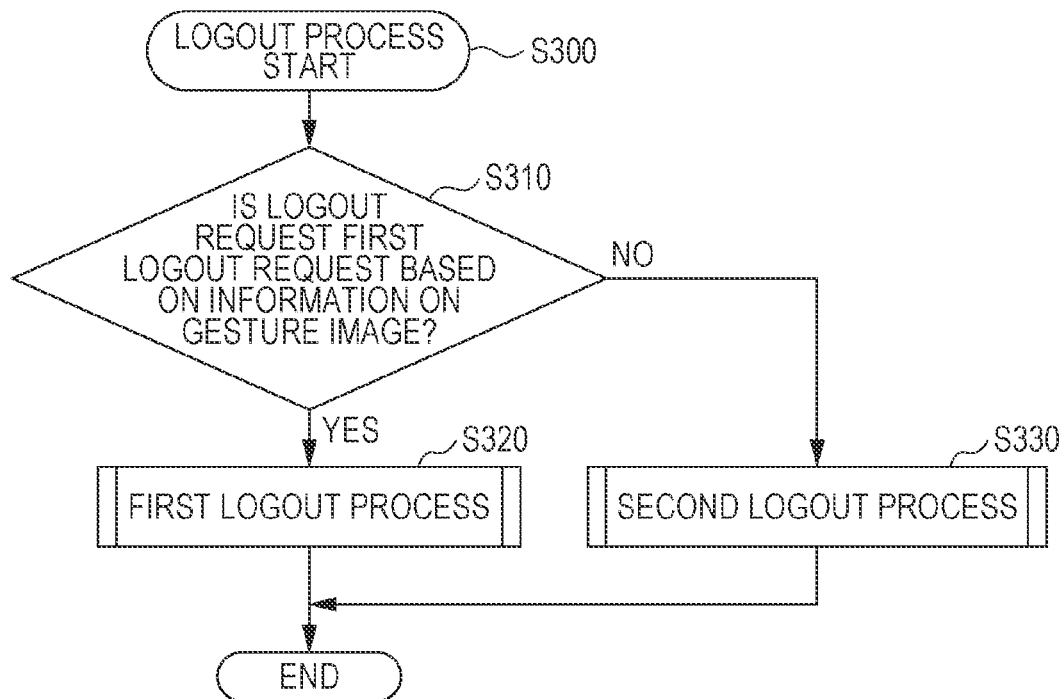
FIG. 10 is a flowchart illustrating a logout process according to another example.

FIG. 10 is a flowchart illustrating the logout process (step S300). The processing portion 120 performs a process of determining whether or not the logout request is the first logout request based on information on the gesture image, performs the first logout process (step S320) when the logout request is the first logout request (YES in step S310), and ends the procedure. On the other hand, the processing portion 120 performs the second logout process (step S330) when the logout request is not the first logout request, that is, the second logout request (NO in step S310), and ends the procedure.

Figure 11:
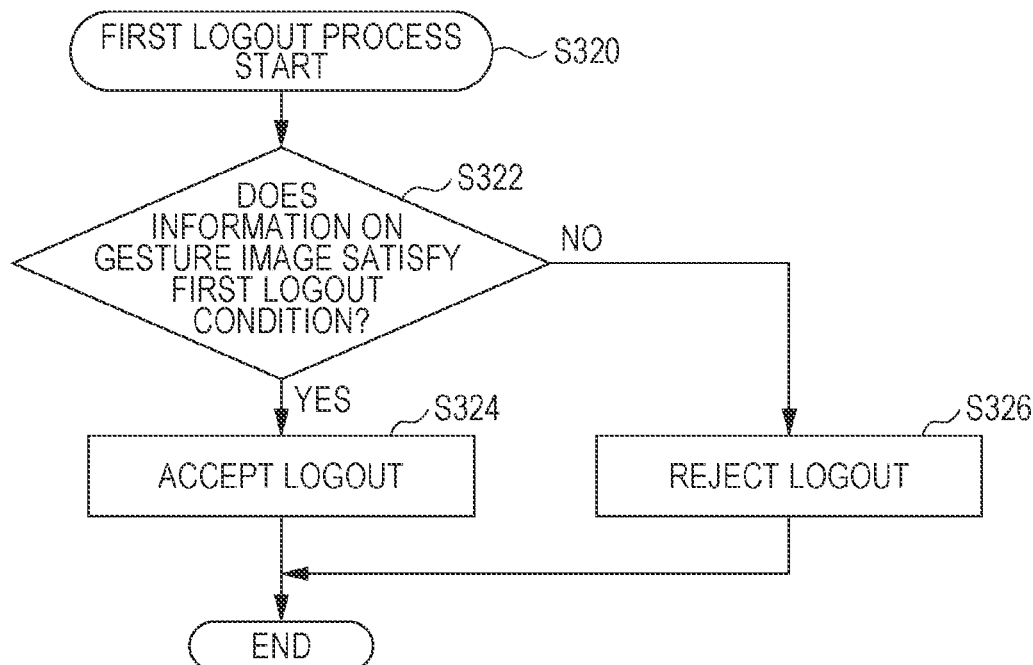
FIG. 11 is a flowchart illustrating a first logout process.

FIG. 11 is a flowchart illustrating the first logout process (step S320). The processing portion 120 performs a process (step S322) of determining whether or not the information on the gesture image satisfies a first logout condition. The information on the gesture image here includes information based on the gesture image which is a captured image. The first logout condition may be, for example, that the similarity between the gesture image based on the gesture performed by the user and the registered gesture image exceeds a predetermined threshold value. Further, for example, when the information based on the gesture image is a character or a number, the first logout condition may be that the character or the number based on the captured gesture image matches the registered character or the number. When it is determined that the information on the gesture image satisfies the first logout condition (YES in step S322), the processing portion 120 performs a process of accepting logout (step S324) and ends the procedure. For example, the processing portion 120 performs a process of generating screen display data before the above-mentioned login process (step S100) is performed, and a process of transmitting the screen display data to the printing device.

On the other hand, when it is determined that the information on the gesture image does not satisfy the first logout condition (NO in step S322), the processing portion 120 performs a process of rejecting the logout (step S326) and ends the procedure. Specifically, the processing portion 120 reports that the similarity between the gesture image based on the gesture performed by the user and the registered gesture image does not exceed the predetermined threshold value, but the reporting is not limited thereto. For example, the processing portion 120 may report that the characters or numbers based on the gesture performed by the user do not match the registered characters or numbers.

A process of re-validating the above-mentioned second logout process (step S330) may be added. This is because the rejecting of the logout may be caused by a malfunction or the like of the processing system 10.

Figure 12:
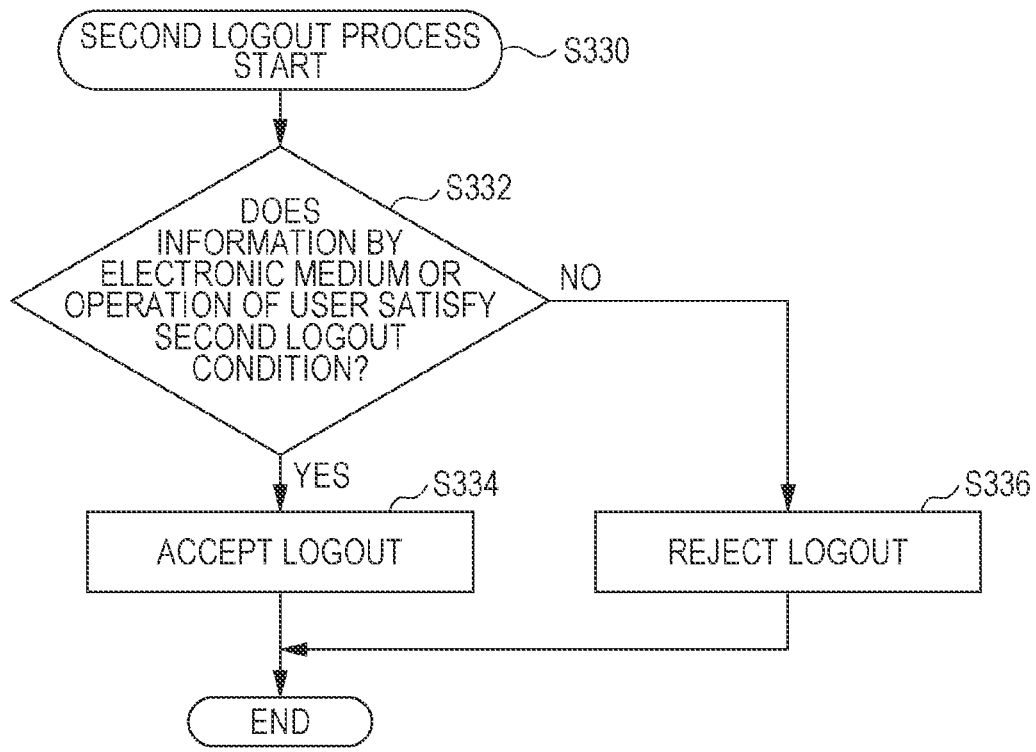
FIG. 12 is a flowchart illustrating a second logout process.

FIG. 12 is a flowchart illustrating the second logout process (step S330). The processing portion 120 performs a process of determining whether or not information by an electronic medium or an operation of the user satisfies a second logout condition. That is, the second logout process (step S330) is a logout by an electronic medium or a logout by an operation on the display 240 by the user. By doing so, it is possible to log out by a method using information other than the information based on the captured image. The second logout condition is that, for example, when the information based on an ID card used for logout matches the information registered as the logged-in user. When it is determined that the information by the electronic medium or the operation of the user satisfies the second logout condition (YES in step S332), the processing portion 120 performs a process of accepting the logout (step S334). Specifically, the same is applied to the above-mentioned step S324.

On the other hand, when it is determined that the information by the electronic medium or the operation by the user does not satisfy the second logout condition (NO in step S332), the processing portion 120 performs a process of rejecting the logout (step S336) and ends the procedure. For example, when logout is performed with an ID card owned by a user different from the logged-in user, a process of transmitting a command to display the fact on the display 240 to the printing device is performed. It is not normally assumed that the logout is rejected by selecting the logout button icon 540 to be described later.

Figure 13:
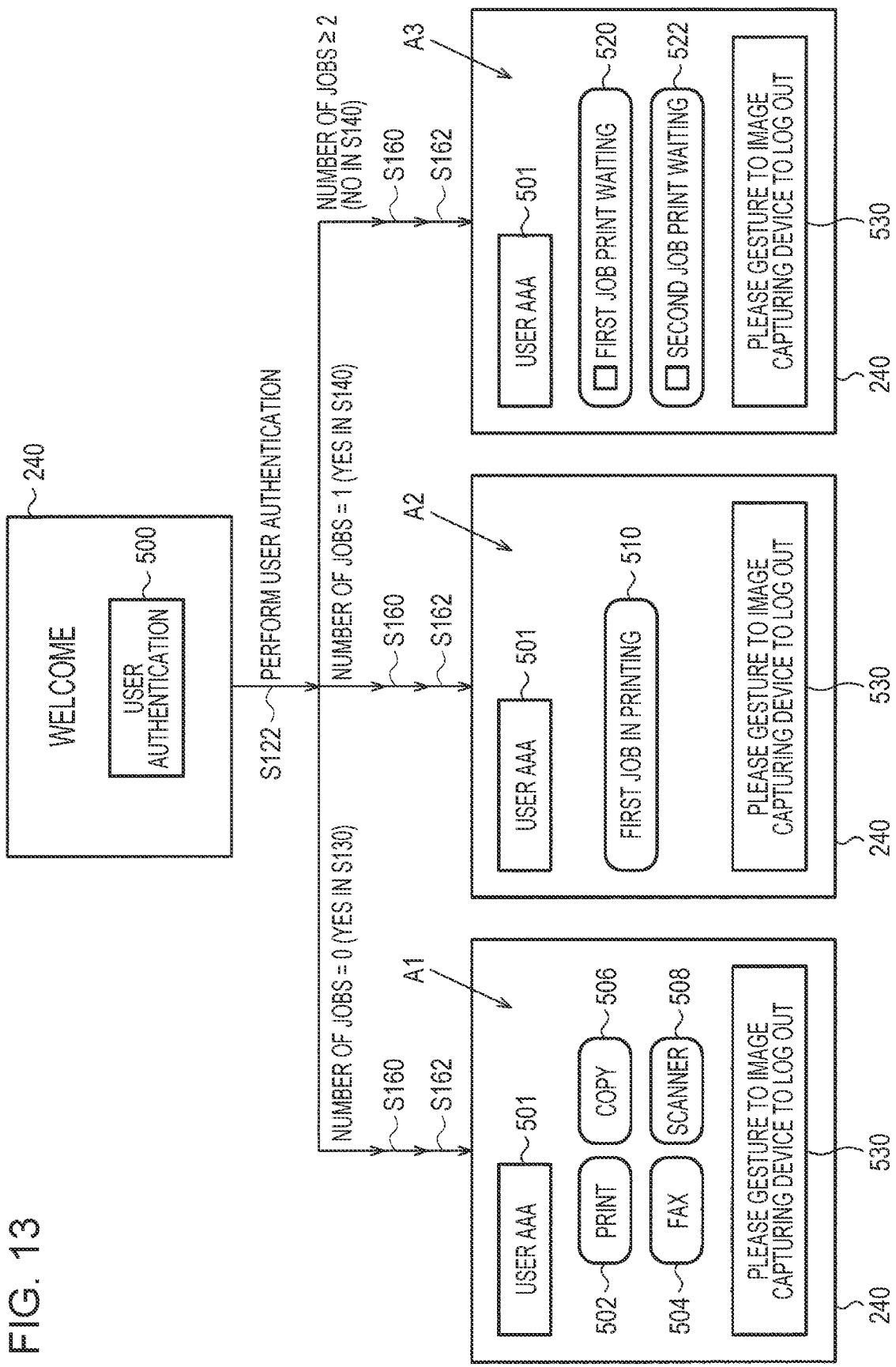
FIG. 13 is a diagram illustrating an example of a screen to which a method of the present embodiment is applied.

FIG. 13 is an example of a screen to which the method of the present embodiment is applied. When the electronic device 200 is activated by powering on, the display 240 displays a user authentication icon 500. Then, when the user selects login by face authentication, that is, when the first login request is made, the processing portion 120 performs the first login process (step S100) described above in FIG. 8. Therefore, depending on the number of jobs, a display image according to any one of the above-mentioned first display mode, second display mode, and third display mode is displayed on the display 240.

Figure 14:
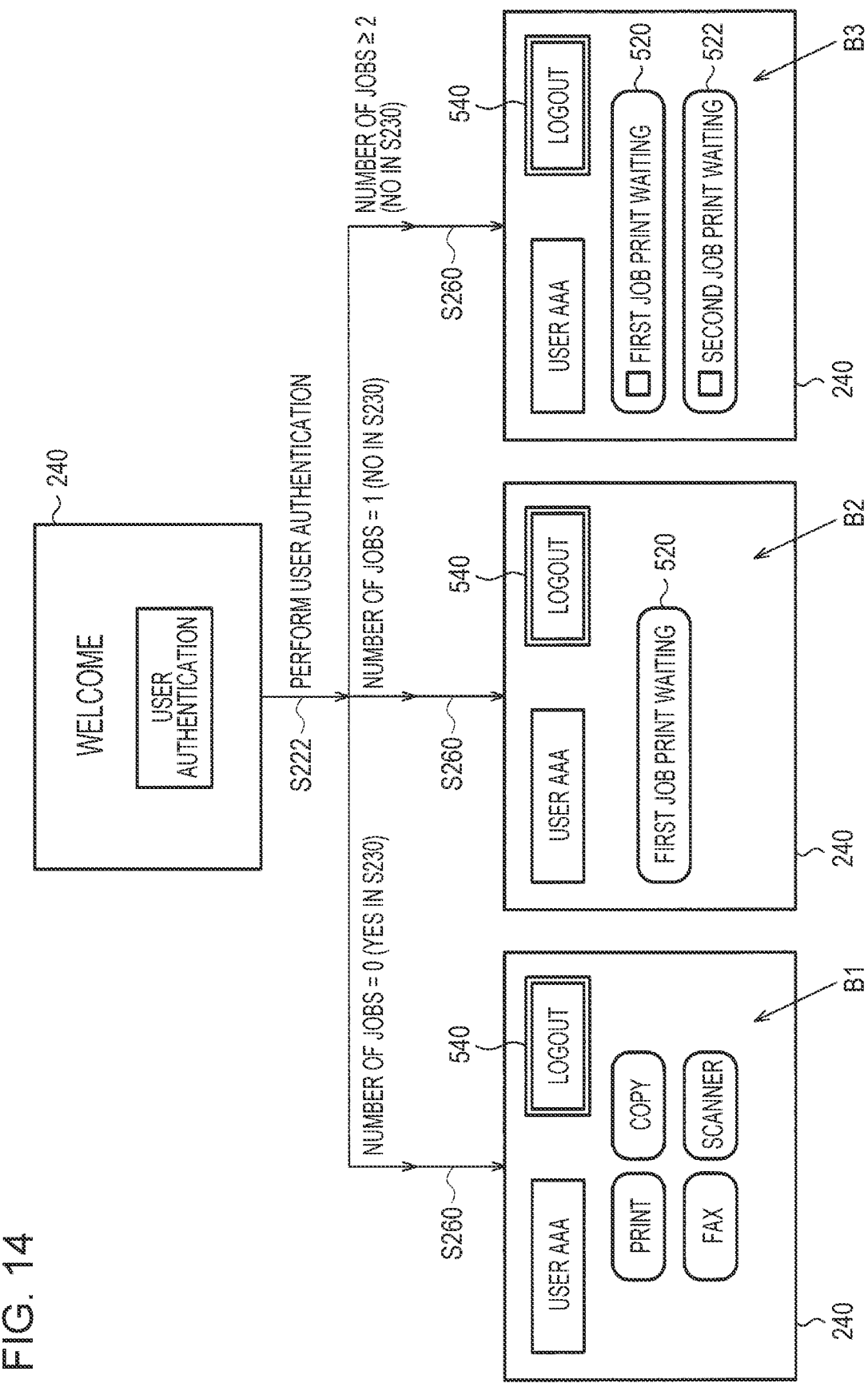
FIG. 14 is a diagram illustrating an example of the screen.

A user display icon 501 is displayed on the display 240 in any of the first display mode to the third display mode. In this way, the user can confirm that the user authentication (step S122) is performed. Further, as shown in A1, A2, and A3, the logout button icon 540 to be described later in FIG. 14 is not displayed on the display 240 in any of the first display mode to the third display mode. This is because the process of step S160 described in FIG. 8 is executed in any of the first display mode to the third display mode. In addition to completely erasing the logout button icon 540, the processing portion 120 may make the shape of the logout button icon 540 different from that shown in FIG. 14, such as making the logout button icon 540 semi-transparent, and may not accept the touch panel operation even if the logout button icon 540 is displayed.

When the number of print jobs is zero (YES in step S130), the display 240 displays a print button icon 502, a FAX button icon 504, a copy button icon 506, and a scanner button icon 508 in a list, as the first display mode. That is, the first display mode is a mode for indicating a list of functions of the printing device. In this way, when the number of print jobs is zero for the user who successfully logs in, the processing portion 120 performs a process of displaying a function list screen of the printing device. By doing so, the user can optionally select the content to be executed for the printing device.

When the number of print jobs is one (YES in step S140), the display 240 displays an in-printing icon 510 as the second display mode. That is, the second display mode is a mode for indicating the execution of printing. As described above, when the number of print jobs is one for the user who successfully logs in, the processing portion 120 executes printing on the printing device and performs a process of displaying a print execution screen. By doing so, the user can cause the printing device to execute the accumulated print job in response to the login.

When the number of print jobs is two or more (NO in step S140), the display 240 displays print waiting icons 520 and 522 as the third display mode. That is, the third display mode is a mode for indicating a list of print jobs for which printing has not yet been executed. As described above, when the number of print jobs is two or more for the user who successfully logs in, the processing portion 120 performs a process of displaying a list screen of a plurality of print jobs. By doing so, the user can appropriately respond to two or more print jobs.

The logout method guide icon 530 is displayed on the display 240 in any of the first display mode to the third display mode. This is because the process of step S162 described in FIG. 8 is executed in any of the first display mode to the third display mode.

The logout method guide icon 530 is a display that guides the user to log out by gesture when login is performed by face authentication, that is, by the first login process (step S120). That is, the processing portion 120 performs the first login process (step S120) based on the captured image and the second login process (step S220) based on information other than the captured image, as the login process. Then, when the first login process (step S120) is performed, the processing portion 120 performs the guide display for guiding the user to perform the first logout process (step S320) by the gesture corresponding to the first login process (step S120) on the display 240 of the electronic device 200. By doing this, the user can recognize that he/she has to log out by gesture.

FIG. 14 is an example of a screen when the processing portion 120 performs the second login process (step S220).

In FIG. 14, the second login process is different from the first login process (step S120) in that, when the number of print jobs is one, the display is performed in the third display mode (NO in step S230), and the print waiting icon 520 is displayed on the display 240. Further, since the second logout process is validated (step S260), the logout button icon 540 is displayed on the display 240 regardless of the number of print jobs. Further, since the process of step S162 of FIG. 8 is not performed, the logout method guide icon 530 is not displayed on the display 240 regardless of the number of print jobs, as shown in B1, B2, and B3, which is different from the first login process. The user can log out from the electronic device 200 by selecting the logout button icon 540 by touch panel operation. That is, the logout button icon 540 is a contact-type logout means. Although not shown, the user may be able to log out by using an ID card or the like in addition to the logout button icon 540.

Figure 15:
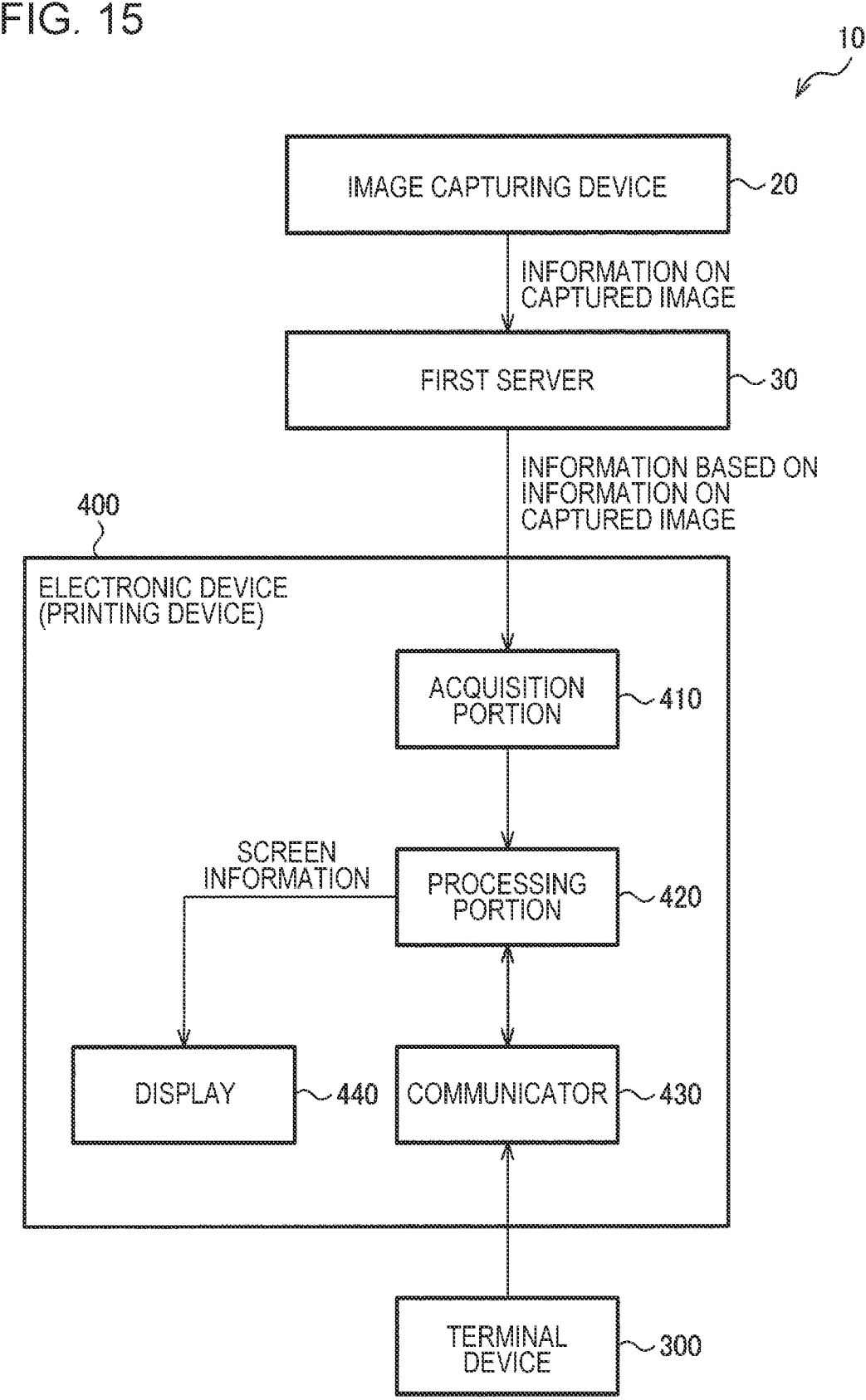
FIG. 15 is a block diagram illustrating a modification example of the present embodiment.

The method of the present embodiment is not limited to the above, and various modifications can be implemented. FIG. 15 is a block diagram illustrating a modification example of the present embodiment. The processing system 10 of FIG. 15 differs from FIG. 5 in that an electronic device 400 also serves as the second server 100 of FIG. 5. That is, the electronic device 400 includes an acquisition portion 410, a processing portion 420, a communicator 430, and a display 440. The acquisition portion 410 corresponds to the acquisition portion 110 of FIG. 1, the processing portion 420 corresponds to the processing portion 120 of FIG. 1, the communicator 430 corresponds to the communicator 130 of FIG. 5, and the display 440 corresponds to the display 240 in FIG. 5. Further, the electronic device 400 may be, for example, a printing device, and in this case, further includes a printing portion (not shown). Therefore, the electronic device 400 can be considered as a printing device in which the processing system 10 of FIG. 1 is further provided with a printing portion. By doing so, it is possible to construct a printing device that acquires information based on the captured image and performs its own login process and the logout process. Further, it is possible to provide a printing device that performs the login process based on face authentication and performs an appropriate guide display.

As described above, the processing system of the present embodiment includes the acquisition portion that acquires authentication result information for face authentication based on the captured image of the user, and the processing portion that performs a process for a print job. Further, when it is determined that the user successfully logs in by the face authentication based on the authentication result information, the processing portion performs a process of displaying, on a display of the printing device, a screen having a different display mode according to a situation of the print job corresponding to the user.

By doing so, appropriate screen information is displayed on the display of the printing device according to the job situation, thereby making it possible for the printing device to appropriately guide the user on the screen. This makes it possible to improve the convenience of the printing device.

Further, the processing portion may perform a process of displaying, on the display, a screen having a different display mode according to the number of print jobs.

By doing so, it is possible to display appropriate screen information on the display according to the number of print jobs.

Further, when the number of print jobs is two or more for the user who successfully logs in, the processing portion may perform a process of displaying a list screen of a plurality of print jobs.

By doing so, the user can appropriately respond to two or more print jobs.

Further, when the number of print jobs is one for the user who successfully logs in, the processing portion may cause the printing device to execute printing and perform a process of displaying a print execution screen.

By doing so, the user can cause the printing device to execute the accumulated print job in response to the login.

Further, when the number of print jobs is zero for the user who successfully logs in, the processing portion may perform a process of displaying a function list screen of the printing device.

By doing so, the user can optionally select the content to be executed for the printing device.

Further, when the number of print jobs is zero for the user who successfully logs in, the processing portion may display a screen of the first display mode. Moreover, when the number of print jobs for the user when the login is successful is one, the processing portion may display a screen of the second display mode. Moreover, when the number of print jobs for the user when the login is successful is two or more, the processing portion may display a screen of the third display mode.

By doing so, it is possible to perform an appropriate guide display according to the number of print jobs.

Further, the server system of the present embodiment includes the above-mentioned processing system and the communicator that communicates with the printing device, and the processing portion gives an instruction to display a screen having a different display mode on the display of the printing device, according to the situation of the print job, via the communicator.

By doing so, it is possible to construct a server system that generates an appropriate guide display and displays the screen of the guide display on the printing device.

Further, when the face authentication is successful, the processing portion may perform a display process of notifying that the face authentication is successful, on the display of the printing device.

By doing so, the user can confirm that he/she logs in by face authentication.

Further, the printing device of the present embodiment includes the above-mentioned processing system and printing portion.

By doing so, it is possible to provide a printing device that performs the login process based on face authentication and performs an appropriate guide display.

Further, the program of the present embodiment causes a computer to function as the acquisition portion that acquires authentication result information for face authentication based on the captured image of the user, and the processing portion that performs the process for a print job. Further, when it is determined that the user successfully logs in by the face authentication based on the authentication result information, the processing portion performs a process of displaying, on a display of the printing device, a screen having a different display mode according to a situation of the print job corresponding to the user.

Although the present embodiment has been described in detail as described above, it will be easily understood by those skilled in the art that various modifications could be made without substantially departing from the novel matters and effects of the present disclosure. Therefore, all such modification examples fall within the scope of the present disclosure. For example, in a specification or drawing, a term described at least once with a different term having a broader meaning or a synonym may be replaced with the different term in any part of the specification or the drawing. All combinations of the present embodiment and modification examples also fall within the scope of the present disclosure. Further, the configuration and operation of the processing system, the server system, the printing device, the non-transitory computer-readable storage medium storing a program, and the like, are not limited to those described in the present embodiment, and various modifications could be made.

What is claimed is:

1. A processing system comprising:
an acquisition portion that acquires authentication result information for face authentication based on a captured image of a user; and
a processor that performs a process for a print job, wherein
when it is determined that the user successfully logs in by the face authentication based on the authentication result information, the processor performs a process of displaying, on a display of a printing device, a screen in a first, second, or third display mode according to a number of print jobs corresponding to the user,
the screen in the second display mode shows an in-printing or print waiting graphical representation when the number of print jobs is one, and
the screen in the third display mode shows the print waiting graphical representation but not the in-printing graphical representation when the number of print jobs is two or more.

2. The processing system according to claim 1, wherein when the number of print jobs is two or more for the user who successfully logs in, the processor performs a process of displaying a list screen of a plurality of the print jobs in the third display mode.

3. The processing system according to claim 1, wherein when the number of print jobs is one for the user who successfully logs in, the processor causes the printing device to execute printing and performs a process of displaying a print execution screen in the second display mode.

4. The processing system according to claim 1, wherein when the number of print jobs is zero for the user who successfully logs in, the processor performs a process of displaying a function list screen of the printing device in the first display mode.

5. The processing system according to claim 1, wherein the processor displays the screen in the first display mode when the number of print jobs is zero for the user who successfully logs in,
displays the screen in the second display mode when the number of print jobs is one for the user who successfully logs in, and
displays the screen in the third display mode when the number of print jobs is two or more for the user who successfully logs in.

6. A server system comprising:
the processing system according to claim 1; and
a communicator that communicates with the printing device, wherein
the processor gives an instruction to display, on the display of the printing device, the screen in the first, second, or third display mode according to the number of print jobs, via the communicator.

7. The server system according to claim 6, wherein when the face authentication is successful, the processor performs a display process of notifying that the face authentication is successful, on the display of the printing device.

8. A printing device comprising:
the processing system according to claim 1; and
a printing portion.

9. A non-transitory computer-readable storage medium storing a program, the program causing a computer to function as:
an acquisition portion that acquires authentication result information for face authentication based on a captured image of a user; and
a processor that performs a process for a print job, wherein
when it is determined that the user successfully logs in by the face authentication based on the authentication result information, the processor performs a process of displaying, on a display of a printing device, a screen in a first, second, or third display mode according to a number of print jobs corresponding to the user,
the screen in the second display mode shows an in-printing or print waiting graphical representation when the number of print jobs is one, and
the screen in the third display mode shows the print waiting graphical representation but not in the in-printing graphical representation when the number of print jobs is two or more.

* * * * *